United States Patent [19]
Afshar et al.

[11] Patent Number: 5,937,903
[45] Date of Patent: Aug. 17, 1999

[54] HIGH PERFORMANCE DIVERTER VALVE

[75] Inventors: Reza Afshar, Cary; Afshin Bazargan, Chapel Hill, both of N.C.

[73] Assignee: Pac-Fab, Inc., Sanford, N.C.

[21] Appl. No.: 08/950,813

[22] Filed: Oct. 15, 1997

[51] Int. Cl.⁶ ................................................. F16K 11/06
[52] U.S. Cl. .................. 137/625.46; 137/597; 210/169; 210/278; 210/425
[58] Field of Search ............................. 137/597, 625.46, 137/625.47; 210/169, 424, 425, 278

[56]  References Cited

U.S. PATENT DOCUMENTS

| | | |
|---|---|---|
| 413,671 | 10/1889 | Jewell et al. . |
| 860,672 | 7/1907 | Ladd . |
| 2,137,406 | 11/1938 | Johnson . |
| 2,662,549 | 12/1953 | Rhinehart et al. . |
| 3,166,499 | 1/1965 | Rudelick . |
| 3,195,726 | 7/1965 | Saurenman ............................... 137/597 |
| 3,365,064 | 1/1968 | Horan, Jr. . |
| 3,471,021 | 10/1969 | Prizler ................................. 137/625.46 |
| 3,499,467 | 3/1970 | McCord et al. . |
| 3,670,893 | 6/1972 | Seid ........................................ 210/169 |
| 3,721,268 | 3/1973 | Erlich et al. . |
| 3,834,537 | 9/1974 | Brett ................................... 137/625.46 |
| 3,874,413 | 4/1975 | Valdez . |
| 3,907,688 | 9/1975 | Close . |
| 3,962,089 | 6/1976 | Fulukawa . |
| 4,062,777 | 12/1977 | Tsuruta et al. . |
| 4,312,377 | 1/1982 | Knecht . |
| 4,355,659 | 10/1982 | Kelchner . |
| 4,466,457 | 8/1984 | Brane et al. . |
| 4,469,131 | 9/1984 | Traylor . |
| 4,545,905 | 10/1985 | Poe ..................................... 137/625.46 |
| 4,553,566 | 11/1985 | Barclay et al. . |
| 4,555,334 | 11/1985 | Cohen .................................... 210/425 |
| 4,564,451 | 1/1986 | Cohen ................................ 137/625.46 |
| 4,669,503 | 6/1987 | McGarrity .......................... 137/625.47 |
| 4,678,564 | 7/1987 | Moorehead ............................. 210/425 |
| 4,714,551 | 12/1987 | Bachhofer et al. . |
| 4,909,933 | 3/1990 | Carter .................................... 210/424 |
| 4,921,598 | 5/1990 | Desch .................................... 210/278 |
| 5,073,260 | 12/1991 | Wilkendorf . |
| 5,152,321 | 10/1992 | Drager et al. . |
| 5,366,021 | 11/1994 | Coleman ................................ 210/169 |
| 5,505,844 | 4/1996 | Porter .................................... 210/278 |

Primary Examiner—Denise L. Ferensic
Assistant Examiner—Ramyar Farid
Attorney, Agent, or Firm—Pearne, Gordon, McCoy & Granger LLP

[57]  ABSTRACT

A diverter valve having a valve body with five ports. A valve assembly is disposed in the valve body and is rotatable between first and second positions. When the valve assembly is in the first position, fluid flows between aligned first and second ports by travelling axially through a cylindrical diverter gate, and fluid flows between aligned third and fourth ports by travelling axially through a generally cylindrical blocking gate. A fifth port is blocked by a waste seal. When the diverter valve is in the second position, the fifth port is open and a blocking projection on the blocking gate closes the fourth port. The blocking gate and the diverter gate direct fluid from the first port to the third port, and from the second port to the fifth port.

16 Claims, 5 Drawing Sheets

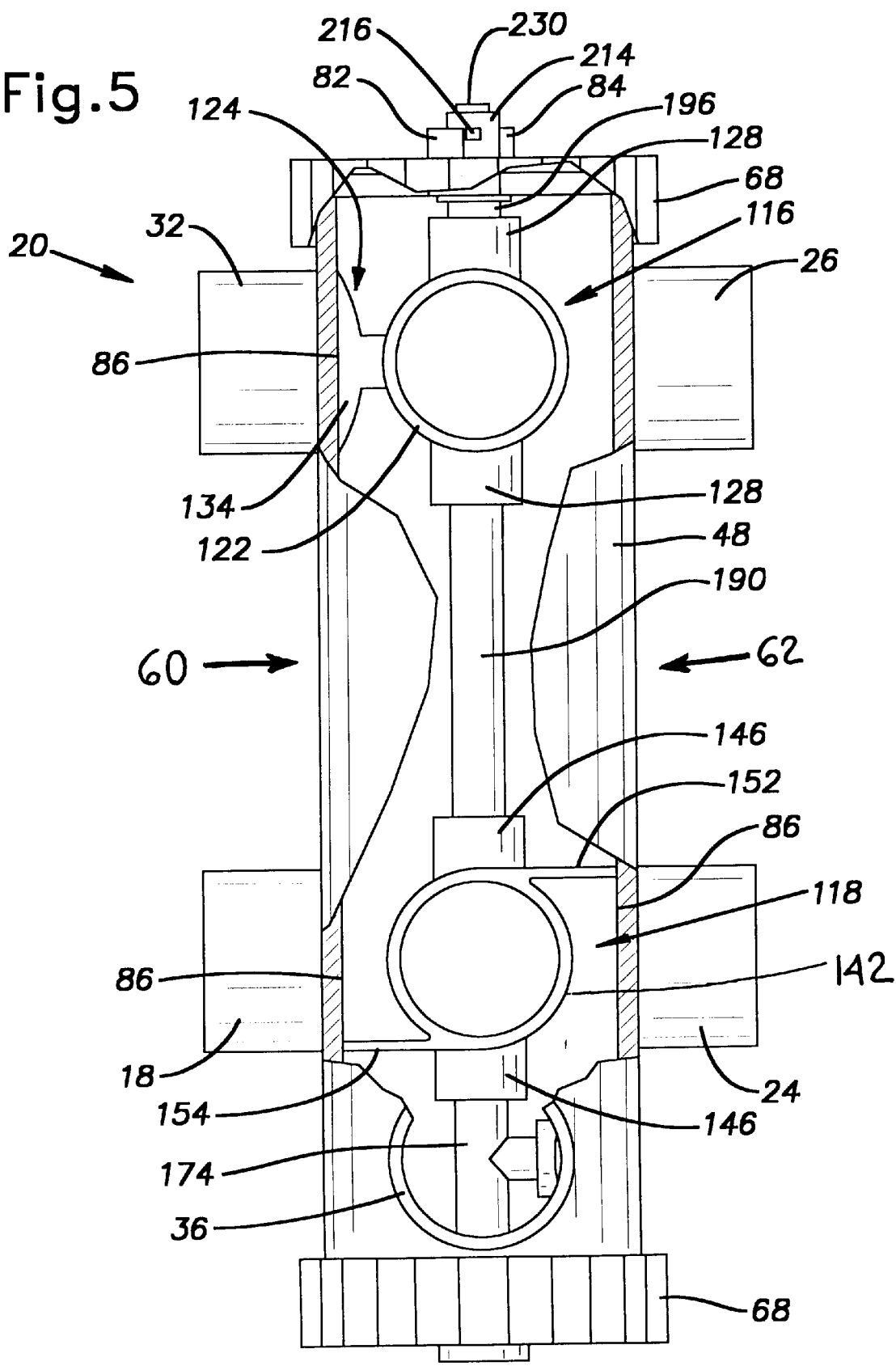

5,937,903

HIGH PERFORMANCE DIVERTER VALVE

BACKGROUND OF THE INVENTION

This invention relates to valves in general and, more particularly, to a diverter valve for changing a flow path of a fluid.

A diverter valve has utility in a variety of fluid handling applications. One of these applications is directing water to and from a backwash filter, such as is used in a swimming pool. In this application, the diverter valve changes the flow path of water between a filter path and a backwash path. In the filter path, water from the swimming pool passes through the filter and then flows back to the swimming pool. In the backwash path, water from the swimming pool passes through the filter in an opposite direction and then flows to a drain. When water flows through the filter path, media in the filter, such as sand, removes and retains contaminants from the water. When water flows through backwash path, the water flushes the contaminants from the media and carries the contaminants to the drain.

Diverter valves used with backwash filters typically fall into one of two categories: multiport valves and slide valves. An example of a multiport valve is shown in U.S. Pat. No. 3,712,268 to Erlich et al., the disclosure of which is incorporated herein by reference, while an example of a slide valve is shown in U.S. Pat. No. 4,714,551 to Bachhofer et al., the disclosure of which is incorporated herein by reference.

A typical multiport valve has an upper body rotatably mounted to a lower body. One or more annular sealing rings are disposed between the upper and lower bodies to prevent external and/or internal leakage. The lower body has a plurality of ports, while the upper body has a plurality of passages extending therethrough. Selective rotation of the upper body causes the passages to interconnect the ports to produce a desired flow path. Since the ports are interconnected through the upper body, water flow through the multiport valve is non-linear. As can be appreciated, non-linear flow through the multiport valve creates a sizable pressure drop.

In addition to introducing a sizable pressure drop, the typical multiport valve tends to be expensive to manufacture because of the complexity of its construction. The typical multiport valve also tends to be difficult to actuate because the entire sealing ring is in frictional engagement with either the upper or the lower body when the upper body is rotated. This large amount of frictional engagement causes the sealing ring to wear out quickly, thereby necessitating frequent replacement.

A typical slide valve for use with a reverse flush filter has a cylindrical body with five ports formed therein. First, fourth and fifth ports are disposed on one side of the body, while second and third ports are disposed on the other side of the body. When the valve is in a filter position, fluid from a swimming pool enters the first port, exits the second port, passes through the filter, enters the third port and passes back to the swimming pool through the fourth port. When the valve is moved to a backwash position, fluid from the swimming pool enters the first port, exits the third port, passes through the filter in an opposite direction, enters the second port, and then passes to a drain through the fifth port.

A control rod having a plurality of valve elements secured thereto is disposed in the body and is longitudinally slidable therein. Often, the control rod is spring-biased toward a filter position. A plurality of seat rings are radially disposed inside the body, around the control rod. The valve elements are moveable between the seat rings and sealingly engage the seat rings to direct water between the applicable ports. As a result, neither the first and second ports, nor the third and fourth ports are aligned. Thus, water flows non-linearly through the slide valve. As can be appreciated, non-linear flow through the slide valve creates a sizable pressure drop.

In addition to creating a sizable pressure drop, the typical slide valve tends to be expensive to manufacture because of the complexity of its construction. The typical slide valve also tends to be difficult to actuate because of the long travel of the control rod. This difficulty is magnified if the control rod is being moved against a spring bias. The long travel of the control rod also tends to cause the seat rings to wear out quickly, thereby necessitating frequent replacement.

Based upon the foregoing, there is a need in the art for a diverter valve that is simple to manufacture, is easy to actuate, and does not introduce a substantial pressure drop when the diverter valve is in a filter mode. The present invention is directed to such a diverter valve.

SUMMARY OF THE INVENTION

It therefore would be desirable, and is an advantage of the present invention, to provide a diverter valve for connection into a conditioning system for a fluid source, wherein the conditioning system includes a conditioning apparatus. The diverter valve includes a valve body having axially aligned first and second ports disposed on opposing sides of the valve body, axially aligned third and fourth ports disposed on opposing sides of the valve body, and a fifth port. The first port is for connection to the fluid source and the second port is for connection to the conditioning apparatus. The third port is for connection to the conditioning apparatus. A valve assembly is disposed inside the valve body. The valve assembly directs fluid through the valve body and is movable between a first position and a second position. When the diverter valve is connected into the conditioning system and the valve assembly is in the first position, fluid enters the first port, exits the second port, passes through the conditioning apparatus, enters the third port and exits the fourth port. When the diverter valve is connected into the conditioning system and the valve assembly is in the second position, fluid enters the first port, exits the third port, passes through the conditioning apparatus, enters the second port, and exits the fifth port.

Also provided in accordance with the present invention is a valve for directing fluid. The valve includes a valve body having aligned first and second ports disposed on opposing sides of the valve body, and aligned third and fourth ports disposed on opposing sides of the valve body. A valve assembly is disposed inside the valve body. The valve assembly directs fluid through the valve body and is movable between a first position and a second position. The valve assembly includes first and second gates. The first gate defines a first linear passage connecting the first and second ports when the valve assembly is in the first position. The second gate defines a second linear passage connecting the third and fourth ports when the valve assembly is in the first position. The second gate cooperates with the first gate to define a passage connecting the first and third ports when the valve assembly is in the second position.

Also provided in accordance with the present invention is a valve for directing fluid, wherein the valve includes a valve body having first, second, third, fourth, and fifth ports. A valve assembly is disposed inside the valve body. The valve assembly directs fluid through the valve body and is movable between a first position and a second position. The valve assembly includes a first gate connected to a second gate by a first shaft, and a stop gate connected to the first gate by a second shaft. The first gate has a first passage extending therethrough. The first passage connects the first and second ports when the valve assembly is in the first position. The second gate has a second passage extending therethrough. The second passage connects the third and fourth ports when the valve assembly is in the first position. The stop gate covers the fifth port when the valve assembly is in the first position.

BRIEF DESCRIPTION OF THE DRAWINGS

The features, aspects, and advantages of the present invention will become better understood with regard to the following description, appended claims, and accompanying drawings where:

FIG. 5 shows a partially cut-away side view of the diverter valve with the internal valve assembly in a backwash position.

DETAILED DESCRIPTION OF THE PREFERRED EMBODIMENTS

Figure 1:
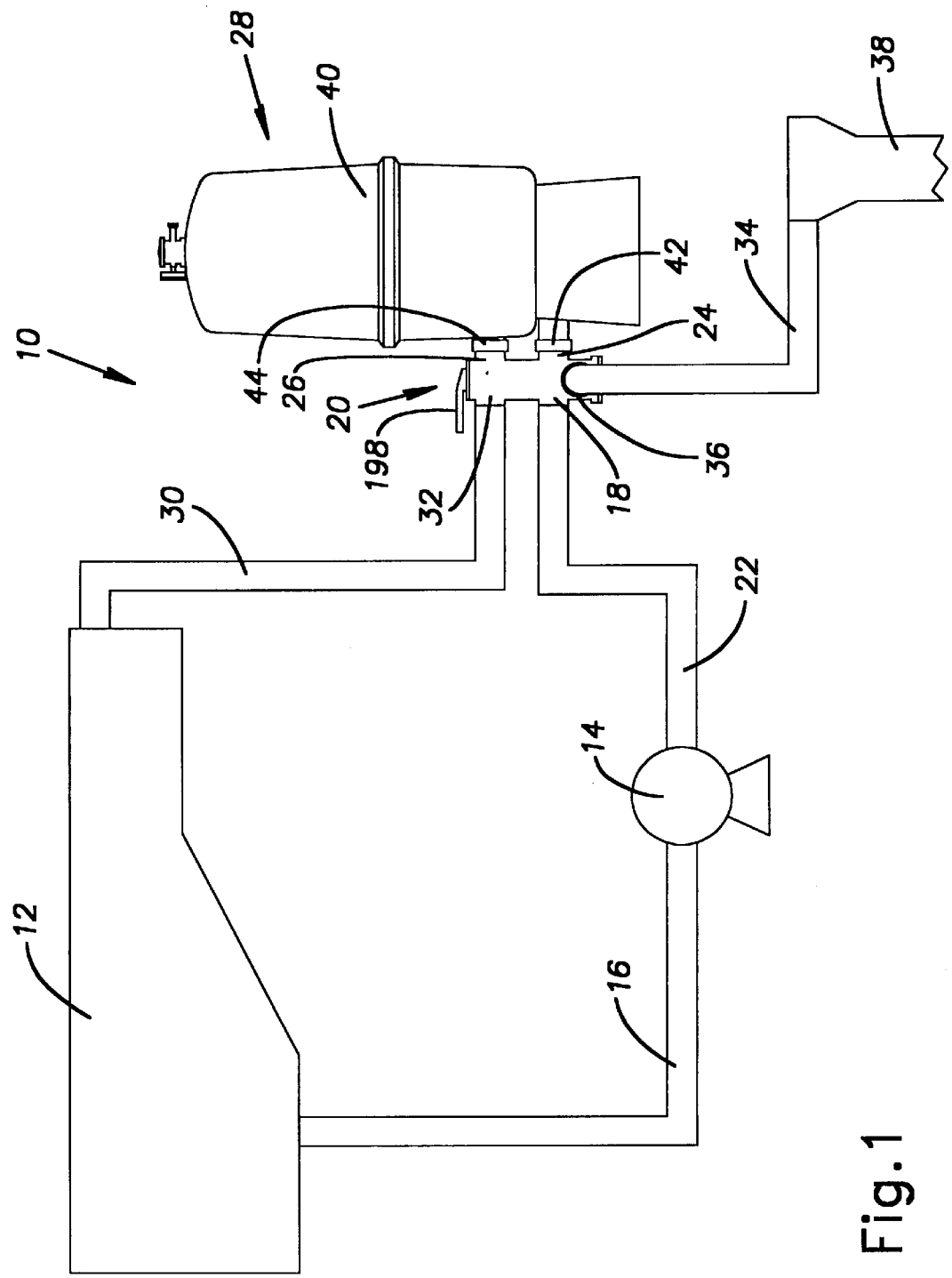
FIG. 1 shows a schematic view of a filter system having a diverter valve.

It should be noted that in the detailed description which follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1 there is shown a schematic view of a filter system 10 for use with a source of fluid, such as a swimming pool 12. A drain discharge of the swimming pool 12 is connected to an input of a pump 14 through a suction line 16. An output of the pump 14 is connected to a first port 18 of a diverter valve 20 through a valve inlet line 22. As will be described in more detail below, second and third ports 24, 26 of the diverter valve 20 are connected to a filter 28. A valve outlet line 30 connects a fourth port 32 of the diverter valve 20 to an inlet of the swimming pool 12. A drain line 34 connects a fifth port 36 of the diverter valve 20 to a drain 38.

The filter 28 has a conventional construction and includes an outer housing 40 with first and second flow connections 42, 44. The first flow connection 42 is connected to the second port 24 of the diverter valve 20, while the second flow connection 44 is connected to the third port 26 of the diverter valve 20. The filter 28 can be of a bed type, wherein water is filtered through a bed of a filter medium such as sand, or of a diatomaceous earth type, wherein water is filtered through a wire mesh having a coating of diatomaceous earth deposited on it. The coating may be formed on the wire mesh by making a slurry of water and diatomaceous earth and circulating it through the filter 28 such that the water passes through the wire mesh while the diatomaceous earth is retained by the wire mesh and becomes deposited thereon. Both types of filter may be cleaned by flowing water in reverse through the filter 28, which is often referred to as backwashing.

Figure 2:
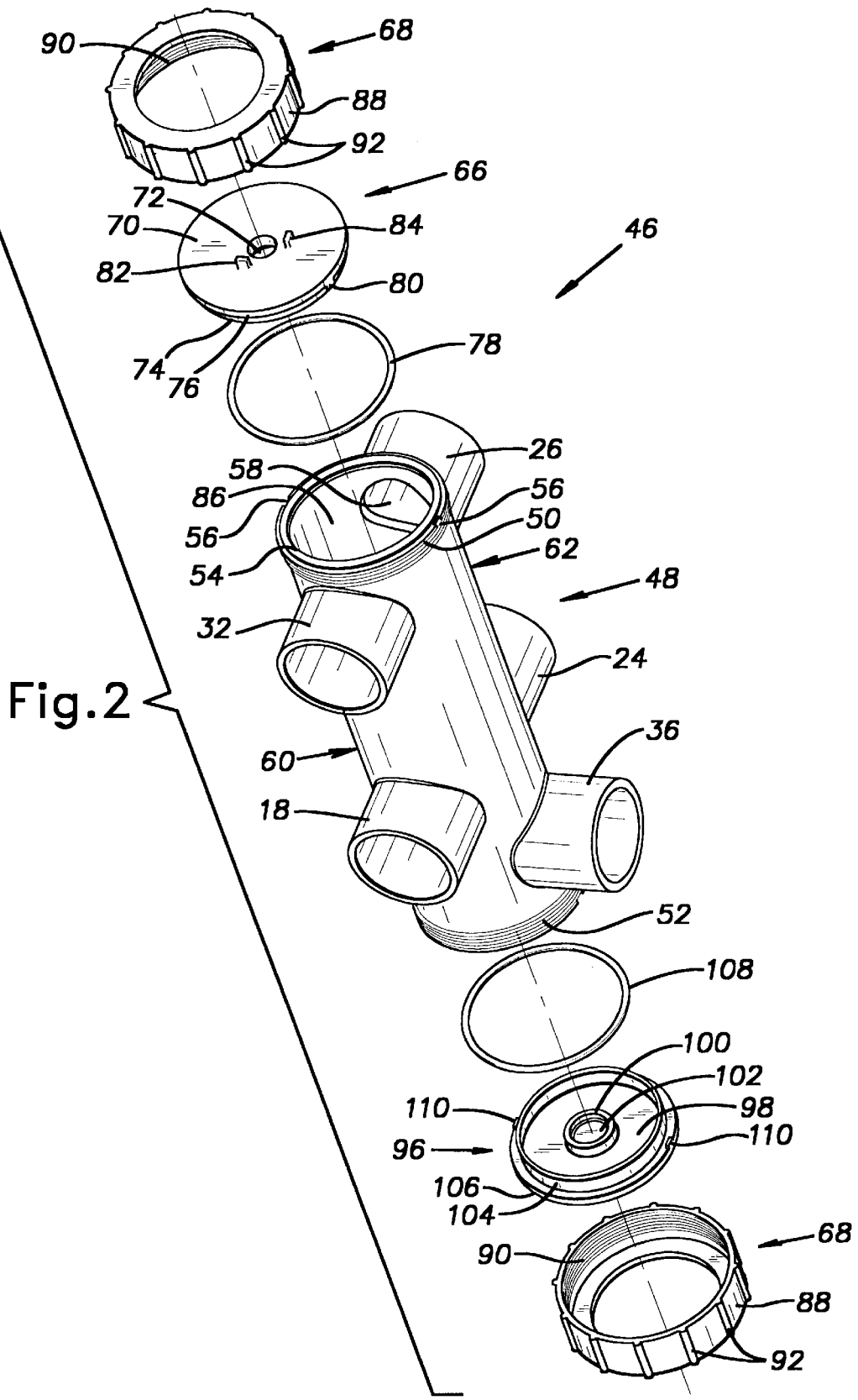
FIG. 2 shows an exploded perspective view of a housing of the diverter valve.

Referring now to FIG. 2 there is shown an exploded perspective view of a housing 46 of the diverter valve 20. The housing 46 includes a valve body 48 with the first through fifth ports 18, 24, 26, 32, 36 extending therefrom. Preferably, the valve body 48 is integrally molded from a rigid plastic, such as polyvinyl chloride (PVC) plastic. The valve body 48 is cylindrical and has threaded top and bottom ends 50, 52. The top end 50 includes a circular top edge 54 with a pair of opposing top notches 56 formed therein. Although not shown, the bottom end 52 similarly includes a circular a bottom edge with a pair of opposing bottom notches formed therein.

Each of the first through fifth ports 18, 24, 26, 32, 36 is cylindrical and opens into the valve body 48 through a circular opening 58 formed in the valve body 48. The first and fourth ports 18, 32 are located on a front or first side 60 of the valve body 48, while the second and third ports 24, 26 are located on an opposite, rear or second side 62 of the valve body 48. The first and second ports 18, 24 are located toward the bottom end 52 of the valve body 48 and are aligned with each other. The third and fourth ports 26, 32 are located toward the top end 50 of the valve body 48 and are aligned with each other. The fifth port 36 is disposed at a substantially right angle to the first through fourth ports 18, 24, 26, 32, and is disposed between the first and second ports 18, 24 and the bottom end 52 of the valve body 48.

A top cap assembly is adapted to be secured to the top end 50 of the valve body 48. The top cap assembly includes a top insert 66 and one of a pair of retainer caps 68.

Preferably, the top insert 66 is integrally molded from a rigid plastic such as acrylonitrile-butadiene-styrene (ABS) plastic. The top insert 66 includes a generally circular member 70 having a center opening 72 formed therein. An annular flange 74 extends downwardly from a bottom surface of the circular member 70 and is spaced inward from a circumferential edge 76 of the circular member 70. An O-ring 78 is provided for disposal around the annular flange 74. A pair of opposing tabs 80 extend downwardly from the circumferential edge 76. First and second stop blocks 82, 84 extend upwardly from a top surface of the circular member 70. The first and second stop blocks 82, 84 are disposed toward the center opening 72 and are orientated at a generally right angle to each other. A "BACKWASH" label may be marked on the circular member 70, adjacent to the first stop block 82, while a "FILTER" label may be marked on the circular member 70, adjacent to the second stop block 84.

The top insert 66 is adapted to be disposed over the top end 50 of the valve body 48 such that the annular flange 74 and the O-ring 78 extend into the top end 50 and the tabs 80 are received in the top notches 56. With the top insert 66 so disposed, the O-ring 78 is compressed between the annular flange 74 and an interior surface 86 of the valve body 48, thereby forming a seal therebetween.

Preferably, the retainer cap 68 is integrally molded from a rigid plastic, such as ABS plastic. The retainer cap 68 is generally cylindrical and includes a side wall 88 having an interior surface with threads 90 formed therein. A plurality of spaced-apart ridges 92 are disposed around the circumference of the side wall 88 and are vertically extending. The retainer cap 68 is adapted to be threaded onto the top end 50 of the valve body 48, over the top insert 66, so as to secure the top insert 66 to the valve body 48. The ridges 92 help an operator grip the retainer cap 68 when installing or removing the retainer cap 68.

A bottom cap assembly is adapted to be secured to the bottom end 52 of the valve body 48. The bottom cap assembly includes a bottom insert 96 and the other one of the retainer caps 68.

Preferably, the bottom insert 96 is integrally molded from a rigid plastic, such as ABS plastic. The bottom insert 96 includes an annular member 98 disposed around a hub 100. The hub 100 defines a hollow 102 having an upwardly-directed opening. An annular flange 104 extends upwardly from an upper surface of the annular member 98. The annular flange 104 is disposed around the hub 100 and is spaced inward from a circumferential edge 106 of the annular member 98. An O-ring 108 is provided for disposal around the annular flange 104. A pair of opposing tabs 110 extend upwardly from the circumferential edge 106.

The bottom insert 96 is adapted to be disposed over the bottom end 52 of the valve body 48 such that the annular flange 104 and the O-ring 108 extend into the bottom end 52 and the tabs 110 are received in the bottom notches. With the bottom insert 96 so disposed, the O-ring 108 is compressed between the annular flange 104 and the interior surface 86 of the valve body 48, thereby forming a seal therebetween.

The retainer cap 68 is adapted to be threaded onto the bottom end 52 of the valve body 48, over the bottom insert 96, so as to secure the bottom insert 96 to the valve body 48.

Figure 3:
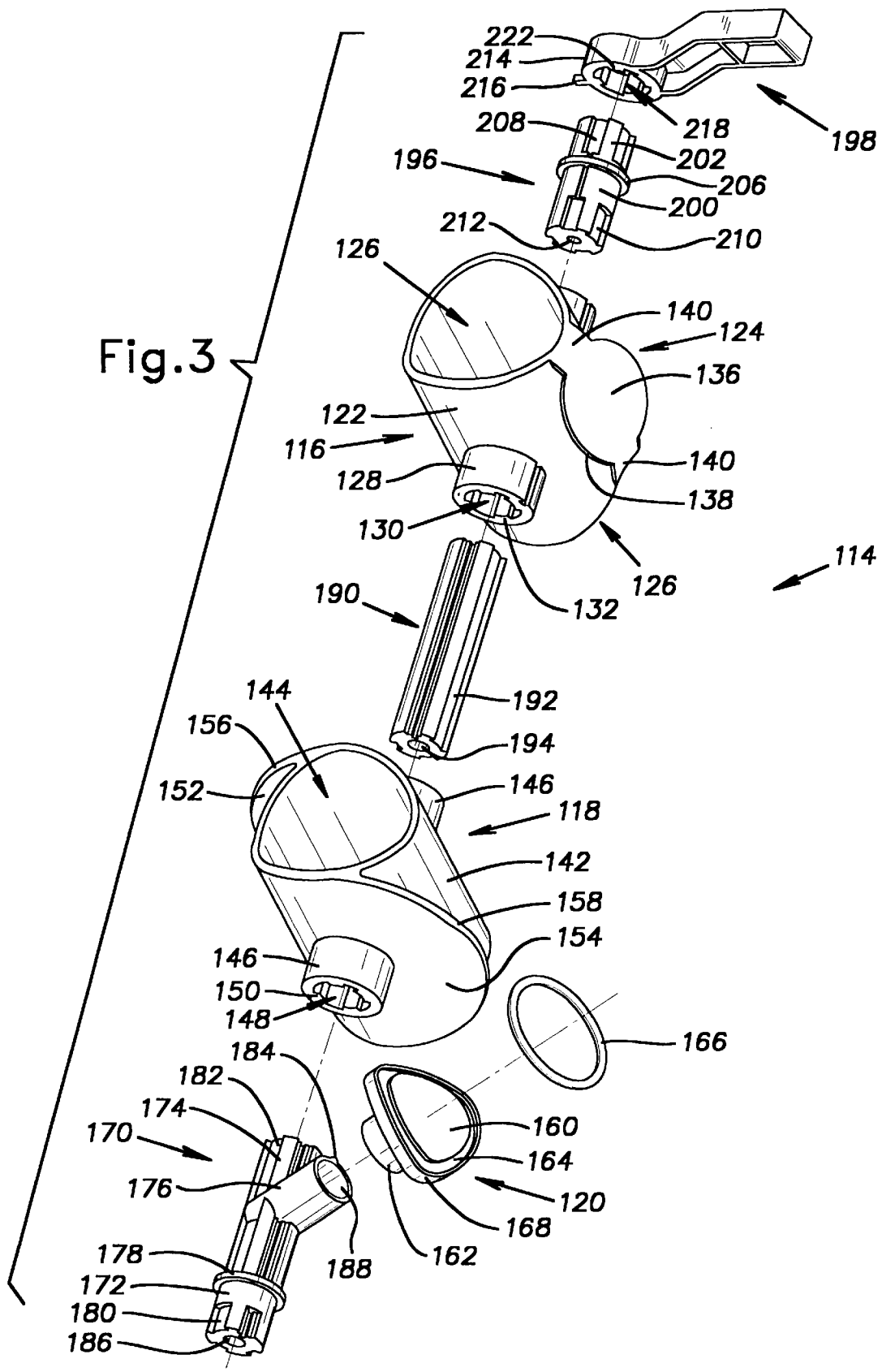
FIG. 3 shows an exploded perspective view of a control assembly.

Referring now to FIG. 3 there is shown an exploded view of a control assembly comprised of an internal valve assembly 114 and a handle 198. The internal valve assembly 114 is for disposal inside the housing 46. The internal valve assembly 114 includes a blocking gate 116, a diverter gate 118, and a stop gate or waste seal 120.

Preferably, the blocking gate 116 is integrally molded from a rigid plastic, such as ABS plastic. The blocking gate 116 includes a generally cylindrical body 122 and a blocking projection 124. The body 122 is hollow and has opposing open ends 126 that are generally concave. Cylindrical mounts 128 are centrally joined to the body 122 on opposing top and bottom portions thereof. The mounts 128 are aligned with each other and are oriented perpendicular to the body 122. Each of the mounts 128 defines an opening 130. A plurality of spaced-apart ridges 132 extend into each of the openings 130 around the circumferences thereof.

Figure 4:
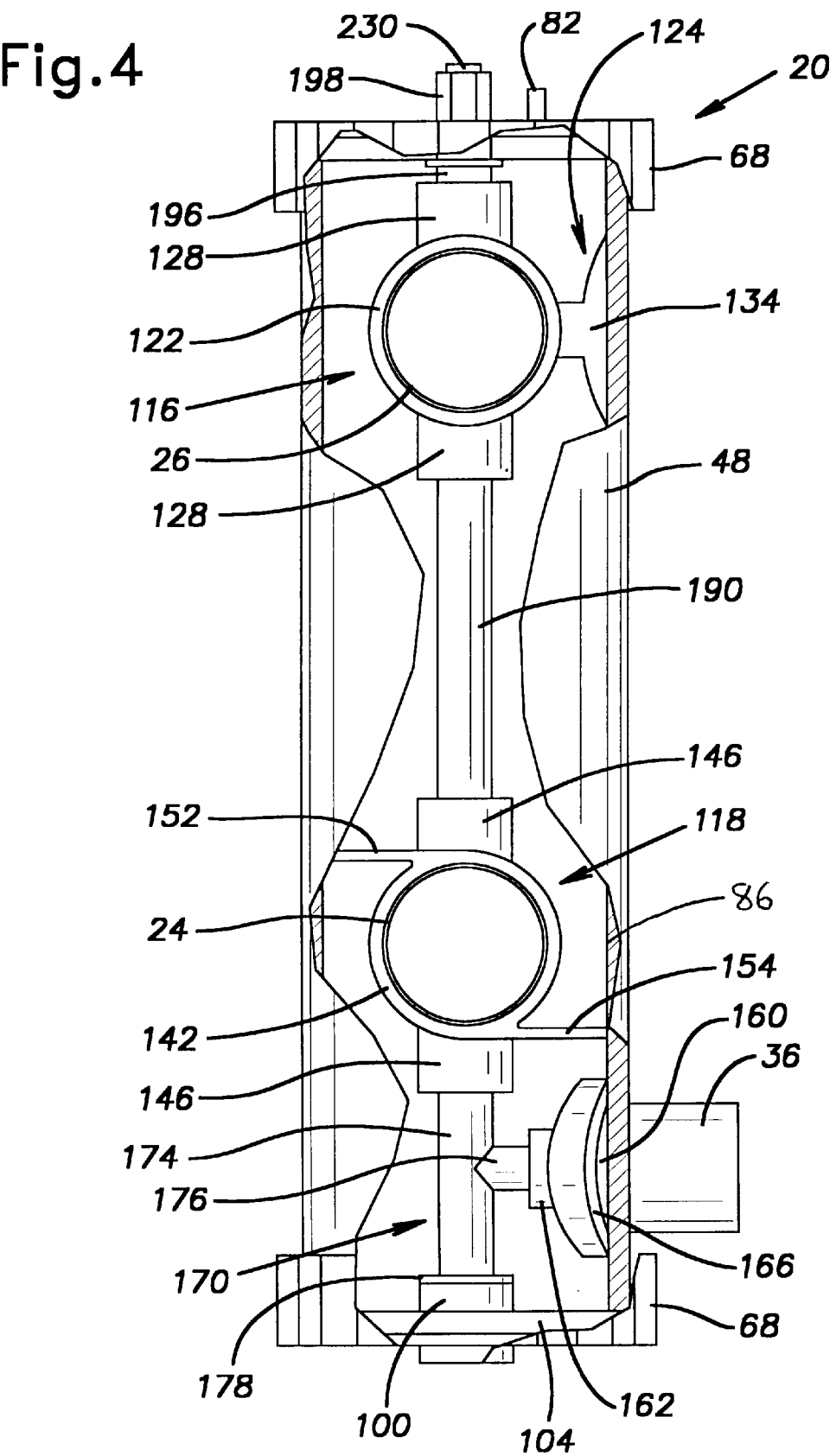
FIG. 4 shows a partially cut-away front view of the diverter valve with an internal valve assembly in a filter position.

The blocking projection 124 includes a base (not shown) joined to a generally semi-spherical head 134 (shown best in FIGS. 4, 5). The base is joined to a side portion of the body 122 and spaces the head 134 from the body 122. The head 134 has a face 136 bounded by a circumferential edge 138. The face 136 is convex in a lateral direction. A pair of ears 140 respectively extend from opposing portions of the circumferential edge 138 to the ends 126 of the body 122.

Preferably, the diverter gate 118 is integrally molded from a rigid plastic, such as ABS plastic. The diverter gate 118 includes a generally cylindrical body 142. The body 142 is hollow and has opposing open ends 144 that are generally concave. Cylindrical mounts 146 are centrally joined to the body 142 on opposing top and bottom portions thereof. The mounts 146 are aligned with each other and are oriented perpendicular to the body 142. Each of the mounts 146 defines a generally circular opening 148. A plurality of spaced-apart ridges 150 extend into each of the openings 148 around the circumferences thereof.

Top and bottom deflector plates 152, 154 are joined to the body 142 and extend in opposing directions therefrom. The top deflector plate 152 is joined to a side portion of the body 142, toward the top thereof, while the bottom deflector plate 154 is joined to an opposing side portion of the body 142, toward the bottom thereof. The top and bottom deflector plates 152, 154 are each generally semi-circular and respectively have arcuate outer edges 156, 158.

Preferably, the waste seal 120 is integrally molded from a rigid plastic, such as ABS plastic. The waste seal 120 includes a head 160 joined to a cylindrical base 162. A cylindrical cavity (not shown) extends through the base 162 and terminates inside the head 160. A furrow (not shown) adjoins the cavity and extends radially outward therefrom. The head 160 is generally disk-shaped and is convex in a lateral direction. An annular groove 164 is formed in the head for receiving an O-ring 166. The groove 164 is spaced inward from a circumferential edge 168 of the head 160.

A waste shaft 170 is provided for connection to the waste seal 120. The waste shaft 170 is preferably composed of rigid plastic and includes a generally cylindrical base 172 joined to a main body 174. A cylindrical mount 176 extends from the main body 174 at a substantially right angle. An annular flange 178 is joined between the base 172 and the main body 174. The base 172 has a plurality of notches 180 disposed around its perimeter, while a plurality of longitudinal grooves 182 are equally spaced around the perimeter of the main body 174. A locking ridge 184 extends along the length of the mount 176. A body bore (not shown) extends through the main body 174, while a base bore 186 extends through the base 172. The base bore 186 may be threaded. A cylindrical hollow 188 is formed in the mount 176.

A central shaft 190 is provided for connecting the blocking gate 116 to the diverter gate 118. The central shaft 190 is preferably composed of rigid plastic and has a generally cylindrical shape. A plurality of grooves 192 are formed in the central shaft 190. The grooves 192 are equally spaced around the perimeter of the central shaft 190 and extend the length of the central shaft 190. A bore 194 extends through the central shaft 190.

An end shaft 196 is provided for connecting the blocking gate 116 to a handle 198. The end shaft 196 is preferably composed of rigid plastic and includes a gate portion 200 and a mounting portion 202. An annular flange 206 is joined between the gate portion 200 and the mounting portion 202. A plurality of longitudinal grooves 208 are equally spaced around the perimeter of the mounting portion 202, while a plurality of notches 210 are equally spaced around the perimeter of the gate portion 200. A lower bore 212 extends through the gate portion 200, while an upper bore (not shown) extends through the mounting portion 202. The upper bore may be threaded.

Preferably, the handle 198 is integrally molded from a rigid plastic, such as ABS plastic. The handle 198 is generally rectangular, with a slight bend being formed in the handle, toward an arcuate inner end 214 thereof. A rectangular protuberance or pointer 216 extends away from the inner end 214. A generally circular bottom cavity 218 and a circular top hole (not shown) are formed in the handle 198, toward the inner end 214. The bottom cavity 218 extends through a bottom surface of the handle 198, while the top hole extends through a top surface of the handle 198. A plurality of spaced-apart ridges 222 extend into the bottom cavity 218 around the circumference of the bottom cavity 218. The top hole extends into the bottom cavity 218 and may be threaded.

Referring now to FIG. 4 there is shown a front view of the diverter valve 20, fully assembled. A portion of the diverter valve 20 is cut-away to better show the interior thereof.

The bottom insert 96 (shown in FIG. 2) is disposed over the bottom end 52 of the valve body 48 in the manner described above. One of the retainer caps 68 is threaded onto the bottom end 52 of the valve body 48, over the bottom insert 96, thereby securing the bottom insert 96 to the valve body 48 and forming the seal therebetween. The base 172 of the waste shaft 170 is rotatably disposed in the hollow 102 of the bottom insert 96 such that the annular flange 178 abuts the hub 100. The mount 176 of the waste shaft 170 is disposed in the cavity of the waste seal 120 such that the locking ridge 184 is received in the furrow, thereby securing the waste seal 120 from rotational movement around the mount 176. The main body 174 of the waste shaft 170 is disposed inside the opening 148 in a bottom one of the mounts 146 of the diverter gate 118 such that the ridges 150 of the mount 146 extend into the grooves 182 of the main body 174, thereby securing the main body 174 from rotational movement inside the opening 148.

The central shaft 190 connects the diverter gate 118 to the blocking gate 116. A bottom end of the central shaft 190 is disposed inside the opening 148 in a top one of the mounts 146 of the diverter gate 118 such that the ridges 150 of the mount 146 extend into the grooves 192 of the central shaft 190, thereby securing the bottom end of the central shaft 190 from rotational movement inside the opening 148. A top end of the central shaft 190 is disposed inside the opening 130 in a bottom one of the mounts 128 of the blocking gate 116 such that the ridges 132 of the mount 128 extend into the grooves 192 of the central shaft 190, thereby securing the top end of the central shaft 190 from rotational movement inside the opening 130.

The top insert 66 is disposed over the top end 50 of the valve body 48 in the manner described above. The other one of the retainer caps 68 is threaded onto the top end 50 of the valve body 48, over the top insert 66, thereby securing the top insert 66 to the valve body 48 and forming the seal therebetween. The gate portion 200 of the end shaft 196 is disposed inside the opening 130 in a top one of the mounts 128 of the blocking gate 116 such that the ridges 132 of the mount 128 extend into the notches 210 of the gate portion 200, thereby securing the gate portion 200 of the end shaft 196 from rotational movement inside the opening 130.

The mounting portion 202 of the end shaft 196 extends through the center opening 72 in the top insert 66. The handle 198 is disposed over the mounting portion 202 of the end shaft 196 such that the pointer 216 of the handle 198 is located between the first and second stop blocks 82, 84. The mounting portion 202 of the end shaft 196 is disposed in the bottom cavity 218 of the handle 198 such that the ridges 222 of the handle 198 extend into the grooves 208 of the end shaft 196, thereby securing the mounting portion 202 of the end shaft 196 from rotational movement inside the bottom cavity 218. A fastening bolt 230 (shown in FIGS. 4, 5) may be threaded through the top hole in the handle 198 and into the upper bore of the end shaft 196 so as to secure the handle 198 to the internal valve assembly 114.

With the diverter valve 20 fully assembled as described above, the internal valve assembly 114 is rotatably disposed inside the valve body 48. The blocking gate 116 is disposed between the third and fourth ports 26, 32 of the valve body 48, while the diverter gate 118 is disposed between the first and second ports 18, 24 of the housing 46. The waste seal 120 is vertically aligned with the fifth port 36.

The internal valve assembly 114 may be rotated between a filter position (shown in FIG. 4) and a backwash position (shown in FIG. 5) by moving handle 198 such that the pointer 216 moves between the first and second stop blocks 82, 84. When the internal valve assembly 114 is in the filter position, the body 122 of the blocking gate 116 extends lengthwise between the third and fourth ports 26, 32, and the body 142 of the diverter gate 118 extends lengthwise between the first and second ports 18, 24. In addition, the head 160 of the waste seal 120 is disposed over the fifth port 36. The blocking gate 116 functions as a conduit for conducting fluid between the third and fourth ports 26, 32 in a linear manner. Similarly, the diverter gate 118 functions as a conduit for conducting fluid between the first and second ports 18, 24 in a linear manner. The O-ring 166 on the head 160 of the waste seal 120, however, forms a seal with the interior surface 86 of the valve body 48 around the fifth port 36, thereby sealing off the fifth port 36 from the interior of the valve body 48.

Any fluid that leaks between the blocking gate 116 and the valve body 48, and any fluid that leaks between the diverter gate 118 and the valve body 48 is retained within the valve body 48 by the seals formed by the waste seal 120 and the top and bottom inserts 66, 96.

Referring now to FIG. 5 there is shown a cut-away side view of the diverter valve 20 with the internal valve assembly 114 in the backwash position. When the internal valve assembly 114 is in the backwash position, the body 122 of the blocking gate 116 extends transverse to the direction between the third and fourth ports 26, 32, and the body 142 of the diverter gate 118 extends transverse to the direction between the first and second ports 18, 24. In addition, the waste seal 120 is spaced from the fifth port 36 so as to permit the fifth port 36 to communicate with the interior of the valve body 48. The blocking projection 124 of the blocking gate 116 is disposed over the fourth port 32 such that the face 136 of the blocking projection 124 adjoins the interior surface 86 of the valve body 48 around the fourth port 32, thereby closing off the fourth port 32 from the interior of the valve body 48.

The outer edge 158 of the bottom deflector plate 154 adjoins the interior surface 86 of the valve body 48 on the first side 60 thereof. The bottom deflector plate 154 is located below the opening 58 of the first port 18 and above the opening 58 of the fifth port 36. The bottom deflector plate 154 cooperates with the body 142 of the diverter gate 118 to guide fluid entering the valve body 48 through the first port 18 upward, along the first side 60 of the valve body 48. Once above the diverter gate 118, the fluid from the first port 18 crosses over to the second side 62 of the valve body 48 and exits the valve body 48 through the third port 26.

The outer edge 152 of the top deflector plate 152 adjoins the interior surface 86 of the valve body 48 on the second side 62 thereof. The top deflector plate 152 is located above the opening 58 of the second port 24 and thereby prevents fluid from the first port 18 from travelling downward, into the second port 24 or the fifth port 36. The blocking projection 124 of the blocking gate 116 prevents fluid from the first port 18 from exiting the valve body 48 through the fourth port 32. Thus, the diverter gate 118 and the blocking gate 116 cooperate to define a passage through the valve body 48 that connects the first port 18 to the third port 26 when the internal valve assembly 114 is in the backwash position.

The top deflector plate 152 also cooperates with the body 142 of the diverter gate 118 to guide fluid entering the valve body 48 through the second port 24 downward, along the second side 62 of the valve body 48. Below the diverter gate 118, the fluid from the second port 24 exits the valve body 48 through the fifth port 36. The bottom deflector plate 154 prevents fluid from the second port 24 from traveling upward along the first side 60 of the valve body 48 to the first port 18. Thus, the diverter gate 118 helps define a passage through the valve body 48 that connects the second port 24 to the fifth port 36 when the internal valve assembly 114 is in the backwash position.

Referring back to FIG. 1, the operation of the filter system 10 will now be described. The internal valve assembly 114 is placed in the filter position by rotating the handle 198 such that the pointer 216 abuts the second stop block 84. When the internal valve assembly 114 is in the filter position, the pump 14 draws water from the swimming pool 12 and pumps it to the diverter valve 20 through the valve inlet line 22. The water enters the diverter valve 20 through the first port 18, travels axially through the diverter gate 118, and exits the diverter valve 20 through the second port 24. The water enters the filter 28 through the first flow connection 42 and passes through the filter bed or coated wire mesh in a first direction, which causes impurities in the water to be removed and retained by the filter bed or coated wire mesh. The filtered water then exits the filter 28 through the second flow connection 44 and re-enters the diverter valve 20 through the third port 26. The filtered water travels axially through the blocking gate 116 and exits the diverter valve 20 through the fourth port 32. The filtered water then travels back to the swimming pool 12 through the valve outlet line 30.

The internal valve assembly 114 is placed in the backwash position by rotating the handle 198 such that the pointer 216 abuts the first stop block 82. When the internal valve assembly 114 is in the backwash position, the pump 14 draws water from the swimming pool 12 and pumps it to the diverter valve 20 through the valve inlet line 22. The water enters the diverter valve 20 through the first port 18, travels upward through the diverter valve 20, and exits the diverter valve 20 through the third port 26. The water enters the filter 28 through the second flow connection 44 and passes through the filter bed or coated wire mesh in an opposite, second direction, which flushes the impurities out of the filter bed or coated wire mesh. If the filter 28 is of the diatomaceous earth type, the water also flushes the diatomaceous earth off the wire mesh. The impurities (and, if applicable, the diatomaceous earth) is mixed with the water to form a waste mixture and is carried out of the filter 28. The waste mixture exits the filter 28 through the first flow connection 42 and re-enters the diverter valve 20 through the second port 24. The waste mixture travels downward through the valve body 48 and exits the diverter valve 20 through the fifth port 36. The waste mixture then travels to the drain 38 through the drain line 34.

It should be appreciated from the foregoing description of the construction and operation of the diverter valve 20 that the diverter valve 20 provides numerous benefits over prior art diverter valves. The construction of the diverter valve 20 permits the diverter valve 20 to be re-configured for a particular application. For example, if the diverter valve 20 is to be used in another filter system where the first and second flow connections 42, 44 of the filter 28 are reversed in position, the valve body 48 can be turned upside down and the top and bottom cap assemblies swapped. With the diverter valve 20 configured in this manner, the base 172 of the waste shaft 170 extends through the center opening 72 in the top insert 66 and into the bottom cavity 218 of the handle 198, while the mounting portion 202 of the end shaft 196 is rotatably disposed in the hollow 102 of the bottom insert 96. The ridges 222 of the handle 198 extend into the notches 180 of the base 172 so as to secure the waste shaft 170 from rotational movement inside the bottom cavity 218. The fastening bolt 230 may be threaded through the top hole in the handle 198 and into the base bore 186 of the waste shaft 170 so as to secure the handle 198 to the internal valve assembly 114.

The construction of the diverter valve 20 also permits the diverter valve 20 to be manufactured using less labor than other prior art diverter valves. The components of the diverter valve 20 may be machine molded and can be quickly assembled together using, at most, only one fastening element (the fastening bolt 230).

In addition to being versatile and simple to manufacture, the diverter valve 20 does not introduce a substantial pressure drop into the filter system 10 when the diverter valve 20 is in the filter position because the water flows linearly through the diverter gate 118 and the blocking gate 116.

Although the preferred embodiment of this invention has been shown and described, it should be understood that various modifications and rearrangements of the parts may be resorted to without departing from the scope of the invention as disclosed and claimed herein.

What is claimed is:

1. A diverter valve for connection into a conditioning system for a fluid source, said conditioning system including a conditioning apparatus, said diverter valve comprising:
   a valve body including:
      axially aligned first and second ports disposed on opposing sides of the valve body, said first port being for connection to the fluid source and said second port being for connection to the conditioning apparatus;
      axially aligned third and fourth ports disposed on opposing sides of the valve body, said third port being for connection to the conditioning apparatus; and
      a fifth port; and
   a valve assembly disposed inside the valve body, said valve assembly directing fluid through the valve body and being rotatably movable between a first position and a second position, said valve assembly having first and second gates defining linear passages for respectively connecting said first and second ports and said third and fourth ports when said valve assembly is in the first position, said second gate being generally cylindrical, and wherein the first and second linear passages extend axially through the first and second gates, respectively, wherein said second gate comprises a blocking projection extending outwardly from said second gate to cover the fourth port when the valve assembly is in the second position;
   wherein when the diverter valve is connected into the conditioning system and the valve assembly is in the first position, fluid enters the first port, exits the second port, passes through the conditioning apparatus, enters the third port and exits the fourth port; and
   wherein when the diverter valve is connected into the conditioning system and the valve assembly is in the second position, fluid enters the first port, exits the third port, passes through the conditioning apparatus, enters the second port, and exits the fifth port.

2. The diverter valve of claim 1 wherein the fifth port is disposed at a substantially right angle to the first and second ports, and to the third and fourth ports.

3. The diverter valve of claim 1 wherein the conditioning system comprises a filter system and wherein the conditioning apparatus comprises a filter apparatus.

4. The diverter valve of claim 3 wherein when the diverter valve is connected into the filter system and the valve assembly is in the first position, the diverter valve directs fluid through the filter apparatus such that the fluid is filtered by the filter apparatus; and wherein when the diverter valve is connected into the conditioning system and the valve assembly is in the second position, the diverter valve directs fluid through the filter apparatus such that the fluid backwashes the filter apparatus.

5. The diverter valve of claim 1 wherein the valve assembly further comprises a stop gate covering the fifth port when the valve assembly is in the first position.

6. The diverter valve of claim 1 wherein the first and second gates cooperate to define a passage connecting the first and third ports when the valve assembly is in the second position.

7. A valve for directing fluid, said valve comprising:
a valve body including:
aligned first and second ports disposed on opposing sides of the valve body; and
aligned third and fourth ports disposed on opposing sides of the valve body; and
a valve assembly disposed inside the valve body, said valve assembly directing fluid through the valve body and being movable between a first position and a second position, said valve assembly including:
a first gate defining a first linear passage connecting the first and second ports when the valve assembly is in the first position; said first gate compromising a generally cylindrical body having oppositely directed upper and lower deflector plates extending therefrom, said upper and lower deflector plates helping direct fluid from the first port to the third port when the valve assembly is in the second position and
a second gate defining a second linear passage connecting the third and fourth ports when the valve assembly is in the first position, said second gate being generally cylindrical, and wherein the first and second linear passages extend axially through the first and second gates, respectively.

8. The valve of claim 7 wherein the valve body further comprises a fifth port.

9. The valve of claim 7 wherein the valve assembly is rotatable between the first and second positions.

10. The valve of claim 8 wherein the second and third ports are connected to a filter apparatus of a fluid filtering system; and wherein when the second and third ports are connected to the filter apparatus and the valve assembly is in the first position, fluid enters the first port, exits the second port, passes through the filter apparatus in a forward direction, enters the third port and exits the fourth port, thereby filtering the fluid; and wherein when the second and third ports are connected to the filter apparatus and the valve assembly is in the second position, fluid enters the first port, exits the third port, passes through the filter apparatus in a reverse direction, enters the second port, and exits the fifth port, thereby backwashing the filter apparatus.

11. The valve of claim 8 further comprising a stop gate covering the fifth port when the valve assembly is in the first position.

12. The valve of claim 11 further comprising:
a first shaft connecting the first gate to the second gate; and
a second shaft connecting the first gate to the stop gate.

13. The valve of claim 7 wherein the first and second ports are located above the fifth port and below the third and fourth ports.

14. A valve for directing fluid, said valve comprising:
a valve body having first, second, third, fourth, and fifth ports; and
a valve assembly disposed inside the valve body, said valve assembly directing fluid through the valve body and being movable between a first position and a second position, said valve assembly including:
a first gate having a first passage extending therethrough, said first passage connecting the first and second ports when the valve assembly is in the first position; said first gate comprising a generally cylindrical body having oppositely directed upper and lower deflector plates helping direct fluid from the first port to the third port when the valve assembly is in the second position;
a second gate having a second passage extending therethrough, said second passage connecting the third and fourth ports when the valve assembly is in the first position;
a stop gate covering the fifth port when the valve assembly is in the first position;
a first shaft connecting the first gate to the second gate; and
a second shaft connecting the first gate to the stop gate.

15. The valve of claim 14 wherein the valve body and the first and second gates are composed of plastic.

16. The valve of claim 11 wherein the second gate comprises a generally cylindrical body having a blocking projection extending therefrom, said blocking projection covering the fourth port when the valve assembly is in the second position; and
wherein the second passage extends axially through the body of the second gate.

* * * * *